United States Patent
Henry (10) Patent No.: US 11,873,628 B2
(45) Date of Patent: Jan. 16, 2024

(54) ROBUST WATER TRADING AND IRRIGATION PERFORMANCE METER MEASUREMENT SYSTEM

(71) Applicant: THE BOARD OF TRUSTEES OF THE UNIVERSITY OF ARKANSAS, Little Rock, AR (US)

(72) Inventor: Christopher G. Henry, Stuttgart, AR (US)

(73) Assignee: THE BOARD OF TRUSTEES OF THE UNIVERSITY OF ARKANSAS, Little Rock, AR (US)

(*) Notice: Subject to any disclaimer, the term of this patent is extended or adjusted under 35 U.S.C. 154(b) by 126 days.

(21) Appl. No.: 17/394,675

(22) Filed: Aug. 5, 2021

(65) Prior Publication Data
US 2022/0106775 A1   Apr. 7, 2022

Related U.S. Application Data

(60) Provisional application No. 63/087,381, filed on Oct. 5, 2020.

(51) Int. Cl.
*E03B 7/07* (2006.01)
*G01F 15/063* (2022.01)

(52) U.S. Cl.
CPC .......... *E03B 7/072* (2013.01); *G01F 15/063* (2013.01)

(58) Field of Classification Search
CPC ......... E03B 7/072; G01F 15/063; G01F 15/07
USPC .......................................................... 73/198
See application file for complete search history.

(56) References Cited

U.S. PATENT DOCUMENTS

| | | | |
|---|---|---|---|
| 6,852,216 B2* | 2/2005 | Moscaritolo | B01D 29/603 96/417 |
| 7,920,983 B1* | 4/2011 | Peleg | G06Q 10/06 702/50 |
| 9,690,303 B1* | 6/2017 | Minton, Jr. | E03B 7/071 |
| 10,474,975 B1 | 11/2019 | France et al. | |
| 2007/0198221 A1* | 8/2007 | James | G01F 15/063 702/45 |
| 2017/0053360 A1* | 2/2017 | Loeb | G06Q 50/06 |
| 2021/0247220 A1* | 8/2021 | Patten | G01F 25/13 |

FOREIGN PATENT DOCUMENTS

| | | | | |
|---|---|---|---|---|
| EP | 0880015 A1 * | 11/1998 | | G01F 15/04 |
| WO | WO-2009049361 A1 * | 4/2009 | | A01G 25/167 |

OTHER PUBLICATIONS

Translation of EP-0880015-A1 (Year: 1998).*

* cited by examiner

*Primary Examiner* — Nathaniel T Woodward
(74) *Attorney, Agent, or Firm* — Michael Best & Friedrich LLP (57) ABSTRACT

A redundant meter measurement system includes a first water sensor configured to measure a first set of water use data and a second water sensor configured to measure a second set of water use data. The system also includes a controller communicatively coupled to the first water sensor and the second water sensor. The controller is configured to receive the first set of water use data from the first water sensor and receive the second set of water use data from the second water sensor. The controller is also configured to store the first set of water use data and the second set of water use data as a collection of water use data. The controller is also configured to enable transmission of the collection of water use data to a remote device.

18 Claims, 8 Drawing Sheets

ROBUST WATER TRADING AND IRRIGATION PERFORMANCE METER MEASUREMENT SYSTEM

CROSS-REFERENCE TO RELATED APPLICATIONS

This application claims priority to U.S. Provisional Application No. 63/087,381, filed Oct. 5, 2020, the entire contents of which are incorporated herein by reference.

STATEMENT REGARDING FEDERALLY SPONSORED RESEARCH OR DEVELOPMENT

This invention was made with government support under 68-7103-17-131 awarded by the United States Department of Agriculture, Natural Resources Conservation Service. The government has certain rights in the invention. Any opinions, findings, conclusions, or recommendations expressed in this publication are those of the author(s) and/or the inventor(s) and do not necessarily reflect the views of the United States Department of Agriculture.

FIELD

Embodiments relate to irrigation water meters, and more particularly, to a redundant meter measurement system and a digital asset exchange system.

SUMMARY

In agricultural irrigation, water meters ("meters") are commonly used for measuring and reporting water use data (water flow or flow rate). Conventional meters include a single measurement mechanism, such as a paddle sensor (for example, a Hall effect sensor), a propeller sensor, or a magnetic field sensor. As one example, a propeller meter generally includes a mechanical register and a propeller positioned within a water passageway to measure water use. The propeller meter typically reports water use with a dial and totalizes water use with an odometer type of mechanism. As another example, a paddle meter generally includes a single paddle sensor positioned at one location within a water passageway at a distance of about third the radius of the water passageway. A hall effect sensor or a proximity sensor may be used to detect revolutions and transmit or display totalized flow based on paddle or propeller speed.

Conventional meters suffer from a number of deficiencies including, for example, inaccurate measurements, lost data, unanticipated failures, and insufficient data analysis and reporting (for example, reporting that is difficult to interpret). For example, conventional paddle meter configurations operate on an assumption that water flow is assumed to be averaged by sampling at one location in a velocity flow profile due to surface friction of the pipe walls. The theoretical water velocity flow profile is assumed, but is rarely the case in actual installations and, thus, regularly requires a correction factor (or K factor) to be applied. Therefore, conventional paddle meters are considered less than desirable because they attempt to represent water flow from one location in the water velocity flow profile of a pipeline rather than an average of an entire cross section. As another example, conventional propeller meters generally have a sealed bearing. However, when that seal fails, water enters the bearing and the shaft housing, and, ultimately infiltrates the register which compromises the entire meter. Such a failure results in destruction of the meter (and an unexpected data loss), which occurs at random and is not preventable. Additionally, conventional meters fail to provide advanced warning of a failure. Yet another shortcoming of conventional meters is that they measure water in a unit of volume. However, irrigation entities (for example, an irrigator, a group of irrigators, an irrigation organization, another irrigation user, or a combination thereof) manage water as a function of application depth (for example, volume divided by area applied). A common practice of irrigators is to read the meter at the beginning and end of a season, calculate the result, and compare the result to an allocation and/or report it to a governing entity. As noted above, conventional meters include a single measurement mechanism. Therefore, conventional meters cannot, among other things, verify measurements, assess quality control issues, assess measurement accuracy, and assess a confidence with respect to measurement accuracy. Additionally, as noted above, conventional meters provide insufficient data analysis and reporting (for example, lack data interpretation that is meaningful to an end user such that an end user may be able to alter their water management during a season). For example, conventional meters typically measure water use and output raw data (for example, raw flowrate data, raw totalized data, or the like). Conventional meters fail to provide any type of data analysis or interpretation with respect to the raw data. Therefore, it is difficult for an irrigation entity to understand, interpret, and improve or optimize their water use.

In many parts of the United States, meters are required to document and manage water rights and, therefore, are closely measured and monitored. However, in other regions, irrigation entities are generally only required to report an estimated water use. In other parts of the United States, meters are voluntary and are installed merely as a source of information for an irrigation entity. Government agencies and regulatory bodies struggle with ascertaining impact to aquifers and water supplies as well as providing incentive programs for irrigation entities to conserve water. For example, irrigation entities generally exhaust their water allocation because there is no incentive to conserve any of their allocation. A common practice is to cost-share or pay incentives for irrigation entities to adopt more efficient irrigation systems. However, when irrigation entities reduce water use with a more efficient irrigation system, they use the conserved water elsewhere.

Additionally, water rights are complicated and difficult to trade or exchange. Municipalities and other water users do not have an effective and efficient means to trade water in a water management district. The transfer of a water right from one entity to another entity is very cumbersome and impractical. Therefore, there is a need for a system where water (water rights) may be traded or exchanged. Additionally, there is a need for a method for converting a water right into a common currency that may be freely traded or transferred among water users.

To solve these and other problems, embodiments described herein relate to a redundant meter measurement system. The redundant meter measurement system provides reliable and redundant water use measurements. Those measurements may be translated into meaningful data and transmitted to an irrigation entity. For example, embodiments described herein may provide for a redundant meter measurement system having a low power system. The low power system may utilize a super capacitor, low energy Bluetooth and low energy microprocessor, and photovoltaic device, such as a solar panel. In some embodiments, the redundant meter measurement system is implemented with two or more water sensors (or water flow sensors). For example, in some embodiments, the redundant meter measurement system is implemented as a six vane meter having multiple measurements within a series of straightening vanes to minimize the effect of turbulence on the water sensors. In such embodiments, the meter may also include onboard processing to verify deviation between the water sensors and the actual operation, flow measurement of water through a water passageway or open channel, or a combination thereof. Alternatively or in addition, in other embodiments, flow is measured or verified with a different type (or multiple types) of water sensors (for example, pressure, propeller, paddle, magnetic, vibration, hall effect, piezoelectric, or a combination thereof) to derive a reliable flow estimate of the water flow within a conduit or passageway. In some embodiments, the redundant meter measurement system is configured to interface with a mobile application provided by a user device (for example, a smart cellphone), a server (for example, a cloud server or Internet of Things (IoT) cloud server), or a combination thereof. Accordingly, in some embodiments, the redundant meter measurement system has cloud connectivity via, for example, a low energy Bluetooth connection, a cellular connection, or a combination thereof. In some embodiments, the redundant meter measurement system implements artificial intelligence to process and interpret water use data.

Alternatively or in addition, the embodiments described herein provide for a digital asset exchange system for trading or exchanging water rights. For example, embodiments described herein may create or generate a water credit (or water right) that is translated into a cryptocurrency, where the cryptocurrency may be traded or exchanged for, for example, currency of another denomination, real property, or a variety of purposes, such as transfer of water rights or conservation incentive as determined by local jurisdiction. The water credit may represent a water savings as determined from a scientific method, a water savings from a junior or senior water right, other benchmarks as determined by a governing body, or the like. The digital asset exchange system may be implemented using a ledger where water use and a water metric are recorded, verified, shared, and synchronized (such as a distributed ledger with a blockchain).

For example, one embodiment provides a method of providing water use feedback. The method includes receiving, from a first water sensor, a first set of water use data associated with a water passageway. The method also includes receiving, from a second water sensor, a second set of water use data associated with the water passageway. The method also includes determining, with an electronic processor, a water use score for the water passageway based on the first set of data and the second set of data. The method also includes generating, with the electronic processor, a displayable report based on at least the water use score.

The method may also include receiving peer performance data, the peer performance data having at least one characteristic in common with a meter subsystem associated with the water passageway. Determining the water use score may include determining the water use score based on the first set of data, the second set of data, and the peer performance data. Generating the displayable report may include generating a displayable report based on the water use score and the peer performance data. The method may also include comparing the peer performance data to the first set of data and the second set of data, wherein the water use score is based on the comparison. The method may also include receiving user input, the user input including at least one selected from a group consisting of a crop type, a soil type, a water district, a crop season duration, a location, a water allocation, and an irrigation entity type, and determining the water use score may include determining the water use score based on the user input.

Another embodiment provides a method of providing digital water assets. The method includes accessing a water use data for an irrigation entity and accessing a water metric associated with the irrigation entity. The method also includes determining, with the electronic processor, a water savings metric based on the water use data and the water metric for the irrigation entity. The method also includes generating, with the electronic processor, a digital water asset based on the water savings metric.

Accessing the water metric may include accessing an assigned water allocation for the irrigation entity. Generating the digital water asset may include generating a transferable water right. The method may also include receiving a transfer request for transferring ownership of the digital water asset to another irrigation entity, and in response to verifying the transfer request, transferring ownership of the digital water asset to the other irrigation entity. In response to verifying the request, the method may include transmitting a transaction record associated with the transfer to each member included in a network of members, wherein the network of members includes at least the irrigation entity and the other irrigation entity. The method may also include enabling a transfer of the digital water asset between the irrigation entity and another irrigation entity. Generating the digital water asset may include assigning ownership of the digital water asset to the irrigation entity.

Yet another embodiment provides a redundant meter measurement system. The system includes a first water sensor configured to measure a first set of water use data and a second water sensor configured to measure a second set of water use data. The system also includes a controller communicatively coupled to the first water sensor and the second water sensor. The controller is configured to receive the first set of water use data from the first water sensor and receive the second set of water use data from the second water sensor. The controller is also configured to store the first set of water use data and the second set of water use data as a collection of water use data. The controller is also configured to enable transmission of the collection of water use data to a remote device.

Yet another embodiment provides a redundant sensor flow meter system configured to measure water flow from more than one location. The flow meter system includes a plurality of sensors positioned within a flow stream in a conduit and an electronic processor coupled to the plurality of sensors. The flow meter system also includes a display coupled to the electronic processor, wherein the electronic processor and the display are configured to collect a sensor output from the plurality of sensors. The flow meter system also includes an on board firmware configured to use a multi sensor algorithm to estimate water flow through the conduit, wherein the algorithm is configured to adjust a flow estimate based on sensor bias and predict at least one of eminent failure, unacceptable error between sensors, or sensor failure. The flow meter system is configured to inform a user of a condition.

Yet another embodiment provides a method for collecting water meter information. The method includes collecting information from a meter user. The method also includes collecting locale information about the water meter, including areas irrigated, crop type, soil type, rainfall and climatic data. The method also includes using artificial intelligence to aggregate data from similar irrigation entities or peers and reporting water use performance to the user.

The method may also include comparing water use data from individual meters to at least one of peer meters or a metric established by a governing body, wherein the metric includes a limiting amount of water use for a crop type for a defined region. The method may also include transferring at least one of water allocations or water rights between irrigation entities between meters and irrigation entities. For a peer to peer network, with proof of work, digital signatures and encryption may be provided to protect at least one of a transfer of rights, allocations, or metrics between irrigation entities. The method may also include exchanging at least one of water rights, allocations, or water savings with other currency types.

Other aspects and embodiments will become apparent by consideration of the detailed description and accompanying drawings.

DETAILED DESCRIPTION

Before any embodiments are explained in detail, it is to be understood the embodiments are not limited in their application to the details of construction and the arrangement of components set forth in the following description or illustrated in the following drawings. Other embodiments are possible and embodiments described and/or illustrated here are capable of being practiced or of being carried out in various ways.

It should also be noted that a plurality of hardware and software-based devices, as well as a plurality of different structural components may be used to implement the embodiments described herein. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments described herein may be implemented in software (for example, stored on non-transitory computer-readable medium) executable by one or more processors. As such, it should be noted that a plurality of hardware and software-based devices, as well as a plurality of different structural components may be utilized to implement various embodiments. It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
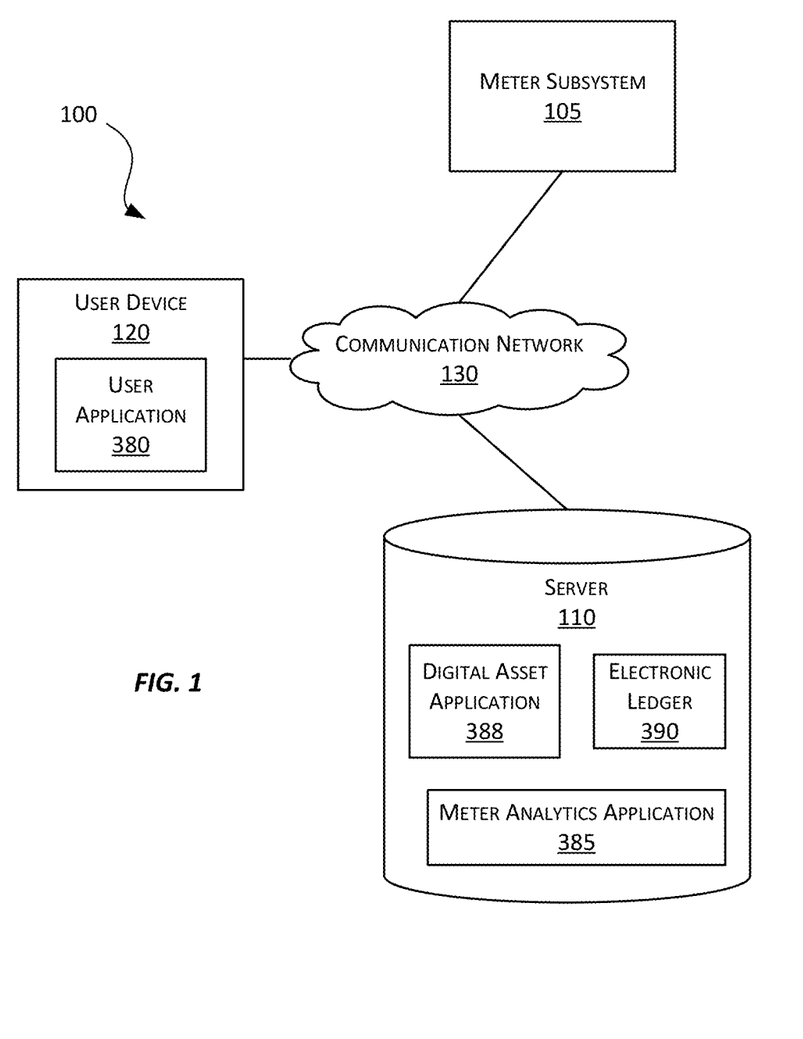
FIG. 1 schematically illustrates a redundant meter measurement system according to some embodiments.

FIG. 1 schematically illustrates a redundant meter measurement system 100 (referred to herein as "the system 100") according to some embodiments. In the illustrated example, the system 100 includes a meter subsystem 105, a server 110, and a user device 120. In some embodiments, the system 100 includes fewer, additional, or different components than illustrated in FIG. 1. For example, the system 100 may include multiple meter subsystems 105, multiple servers 110, multiple user devices 120, or a combination thereof.

The meter subsystem 105, the server 110, and the user device 120 communicate over one or more wired or wireless communication networks 130. Portions of the communication networks 130 may be implemented using a wide area network ("WAN"), such as the Internet, a local area network ("LAN"), such as a Bluetooth™ network or Wi-Fi, LoRa, and combinations or derivatives thereof. For example, in some embodiments, as described in greater detail below, one or more components of the system 100 may communicate through a cellular connection provided by a cellular modem, a low energy Bluetooth connection provided by a low energy Bluetooth beacon, or a combination thereof. Alternatively or in addition, in some embodiments, components of the system 100 communicate directly as compared to through the communication network 130. Also, in some embodiments, the components of the system 100 communicate through one or more intermediary devices not illustrated in FIG. 1.

Figure 2:
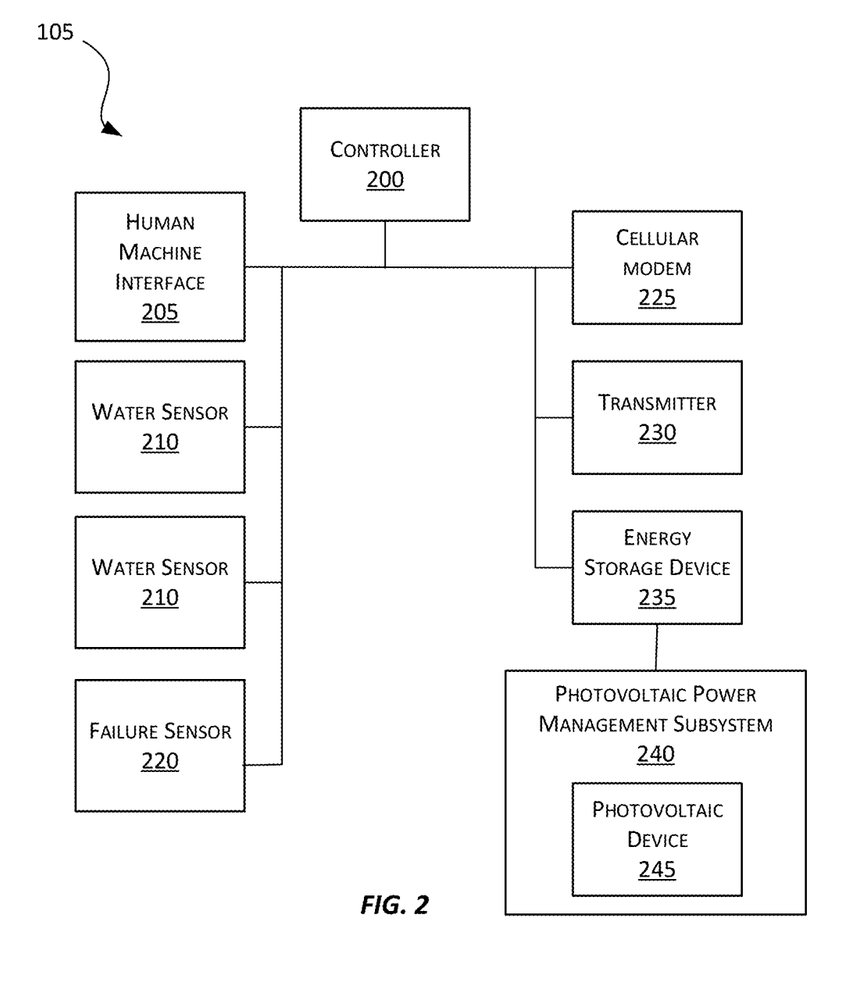
FIG. 2 schematically illustrates a meter subsystem of the system of FIG. 1 according to some embodiments.

The meter subsystem 105 is configured to monitor and collect water use data associated with water flowing through, for example, a water passageway (such as a water pipe). FIG. 2 schematically illustrates the meter subsystem 105 according to some embodiments. In the illustrated example, the meter subsystem 105 includes a controller 200, a human machine interface 205, a plurality of water sensors 210 (referred to herein collectively as "the water sensors 210" and individually as "a water sensor 210"), a failure sensor 220, a cellular modem 225, a transmitter 230, an energy storage device 235, and a photovoltaic power management subsystem 240. In some embodiments, the meter subsystem 105 includes fewer, additional, or different components than illustrated in FIG. 2. For example, the meter subsystem 105 may include multiple human machine interfaces 205, multiple failure sensors 220, multiple cellular modems 225, multiple transmitters 230, multiple energy storage devices 235, multiple photovoltaic subsystems 240, or a combination thereof. As another example, the meter subsystem 105 may include either the cellular modem 225 or the transmitter 230 (as opposed to both the cellular modem 225 and the transmitter 230). As yet another example, the meter subsystem 105 may include a global positioning system ("GPS") receiver, such as for geolocating the meter subsystem 105.

Figure 3:
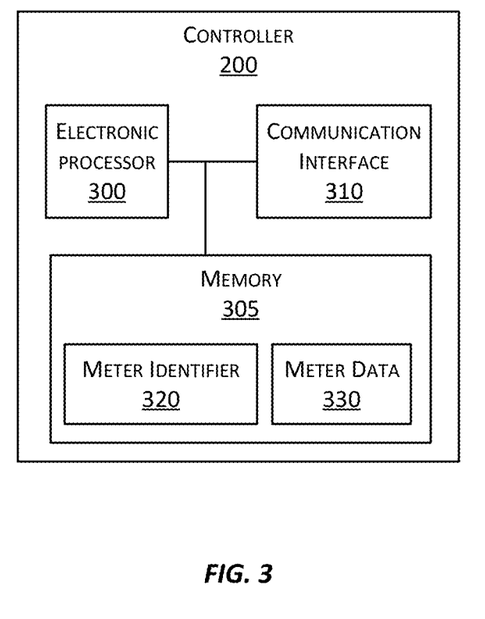
FIG. 3 schematically illustrates a controller of the meter subsystem of FIG. 2 according to some embodiments.

As seen in FIG. 3, the controller 200 includes an electronic processor 300 (for example, a microprocessor, an application-specific integrated circuit ("ASIC"), or another suitable electronic device), a memory 305 (for example, a non-transitory, computer-readable medium), and a communication interface 310. The electronic processor 300, the memory 305, and the communication interface 310 communicate wirelessly, over one or more communication lines or buses, or a combination thereof. The controller 200 may include additional components than those illustrated in FIG. 3 in various configurations. The controller 200 may also perform additional functionality other than the functionality described herein. Also, the functionality described herein as being performed by the controller 200 may be distributed among multiple controllers or devices.

The communication interface 310 allows the controller 200 to communicate with devices external to the controller 200. For example, as illustrated in FIG. 2, the controller 200 may communicate with the human machine interface 205, the water sensors 210, the failure sensor 220, the cellular modem 225, the transmitter 230, and/or the energy storage device 235. The communication interface 310 may include a port for receiving a wired connection to an external device (for example, a universal serial bus ("USB") cable and the like), a transceiver for establishing a wireless connection to an external device (for example, over one or more communication networks, such as the Internet, a LAN, a WAN, and the like), or a combination thereof.

The electronic processor 300 is configured to access and execute computer-readable instructions ("software") stored in the memory 305. The software may include firmware, one or more applications, program data, filters, rules, one or more program modules, and other executable instructions. For example, the software may include instructions and associated data for performing a set of functions, including the methods described herein. As described in greater detail below, in some embodiments, the electronic processor 300 accesses and executes software for performing failure detection or prediction, data collection, analysis, and reporting, or a combination thereof.

As seen in FIG. 3, the memory 305 stores a meter identifier 320 associated with the meter subsystem 105. The meter identifier 320 may be, for example, a unique serial number, a universally unique identification ("UUID"), or another identifier that uniquely identifies the meter subsystem 105. Alternatively or in addition, the memory 205 may also store meter data 330. Meter data 330 may include, for example, failure data, water use data, field data, or a combination thereof. Failure data is related to an integrity or operating status of the meter subsystem 105 (or one or more components thereof). The failure data may be indicative of an actual failure, sensor bias, an eminent failure, or a combination thereof with respect to the meter subsystem 105 (or one or more components thereof). The controller 200 may receive the failure data from the failure sensor 220 through the communication interface 310 and store the failure data in the memory 305 (as meter data). Water use data is related to a water flow or flow rate associated with water flowing through a water passageway (for example, totalized flow data). Water use data may be indicative of how much water has flowed through a water passageway (for example, how much water has been used). The controller 200 may receive the water use data from one or more of the water sensors 210 through the communication interface 310 and store the water use data in the memory 305 (as meter data). Field data (or site specific information) may include data related to, for example, a location, a crop type, a soil type, a soil texture, a water district, climate data, an irrigation entity type, a crop season duration, a water allocation, a water right, and the like. The field data (or a portion thereof) may be associated with an irrigation entity, a meter subsystem of the irrigation entity (such as the water subsystem 105), a field of the irrigation entity, a facility of the irrigation entity, or a combination thereof. In some embodiments, field data is provided by an irrigation entity via the user device 120, the human machine interface 205, or a combination thereof. The controller 200 may receive the field data from the user device 120, the human machine interface 205, or a combination thereof through the communication interface 310 and store the field data in the memory 305 (as meter data). Alternatively or in addition, the controller 200 may receive the field data (via the communication interface 310) from another component of the meter subsystem 105 (such as a GPS receiver), a component external to the meter subsystem 105 (such as a remote database or device), or a combination thereof. As one example, the meter subsystem 105 may include a GPS receiver for geolocation of the meter subsystem 105. In such embodiments, the controller 200 receives location information (as field data) for the meter subsystem 105 from the GPS receiver and stores the location information in the memory 305 (as meter data). Alternatively or in addition, the user device 120 may provide information, such as field data, to the meter subsystem 105. As one example, the meter subsystem 105 may receive an indication of a location of the meter subsystem 105 from the user device 120 (via location services implemented by the user device 120).

The water sensors 210 are configured to measure water use (for example, a water flow or flow rate) associated with water flowing through, for example, a water passageway. A water sensor 210 may include, for example, a propeller sensor, a paddle sensor, a magnetic field sensor, and the like. In some embodiments, the meter subsystem 105 includes more than one water sensor 210 such that the meter subsystem 105 provides redundant water use measurements. Redundant measurements may confirm that the meter subsystem 105 is measuring water flow or use, improve measurement accuracy and confidence, and the like. In some embodiments, the controller 200 constantly analyzes a difference between the measurements to assess whether there is a quality control issue to report, such as sensor bias increases. The controller 200 may then report to an irrigation entity that the meter subsystem 105 (or one or more components thereof) may need maintenance or other services. As one example, the controller 200 may report to an irrigation entity when a sensor bias reaches a threshold or is determined to deviate. As another example, the controller 200 may report to an irrigation entity when a component of the meter subsystem 105 fails, such as a water sensor of the meter subsystem 105. As yet another example, the controller 200 may report to an irrigation entity when a vibration of a bearing increases (indicating a future failure).

In the example illustrated in FIG. 2, the meter subsystem 105 includes two water sensors 210 (for example, a first water sensor and a second water sensor). Although the example illustrated in FIG. 2 includes two water sensors 210, the meter subsystem 105 may include any number of water sensors 210, such as one water sensor 210, four water sensors 210, six water sensors 210, eight water sensors 210, or the like. In some embodiments, the water sensors 210 are of similar type (implement the same or similar measurement methods). As one example, each of the water sensors 210 may be a paddle sensor. As another example, each of the water sensors 210 may be magnetic field sensors. In other embodiments, the water sensors 210 are of different types (implement different measurement methods). As one example, a first water sensor 210 may be a paddle sensor and a second water sensor 210 may be a propeller sensor. As another example, a first water sensor 210 may be a magnetic field sensor and a second water sensor 210 may be a propeller sensor.

Each of the water sensors 210 may be associated with (or positioned at) a similar (or the same) position or location along the water passageway such that the measurements of each water sensor 210 are associated with a similar (or the same) section or portion of the water passageway. In some embodiments, each of the water sensors 210 are associated with a measurement zone within a water passageway. Accordingly, each water sensor 210 may collect or measure water use data for a measurement zone within the water passageway. As one example, a first water sensor 210 may collect water use data for a first measurement zone while a second water sensor 210 may collect water use data for a second measurement zone. In some embodiments, the measurement zones are different measurement zones. However, in other embodiments, at least a portion of the measurement zones are the same. For example, in some embodiments, a measurement zone (or a portion thereof) may overlap with at least one additional measurement zone (or a portion thereof). As one example, a first water sensor 210 may be configured to measure water use data for a first measurement zone and a second water sensor 210 may be configured to measure water use data for a second measurement zone. The first measurement zone may be the same (or substantially the same) as the second measurement zone. Alternatively, a portion of the first measurement zone may overlap with a portion of the second measurement zone. Each of the water sensors 210 may be associated with and collects water use data for a different measurement zone within the water passageway.

Figure 4A:
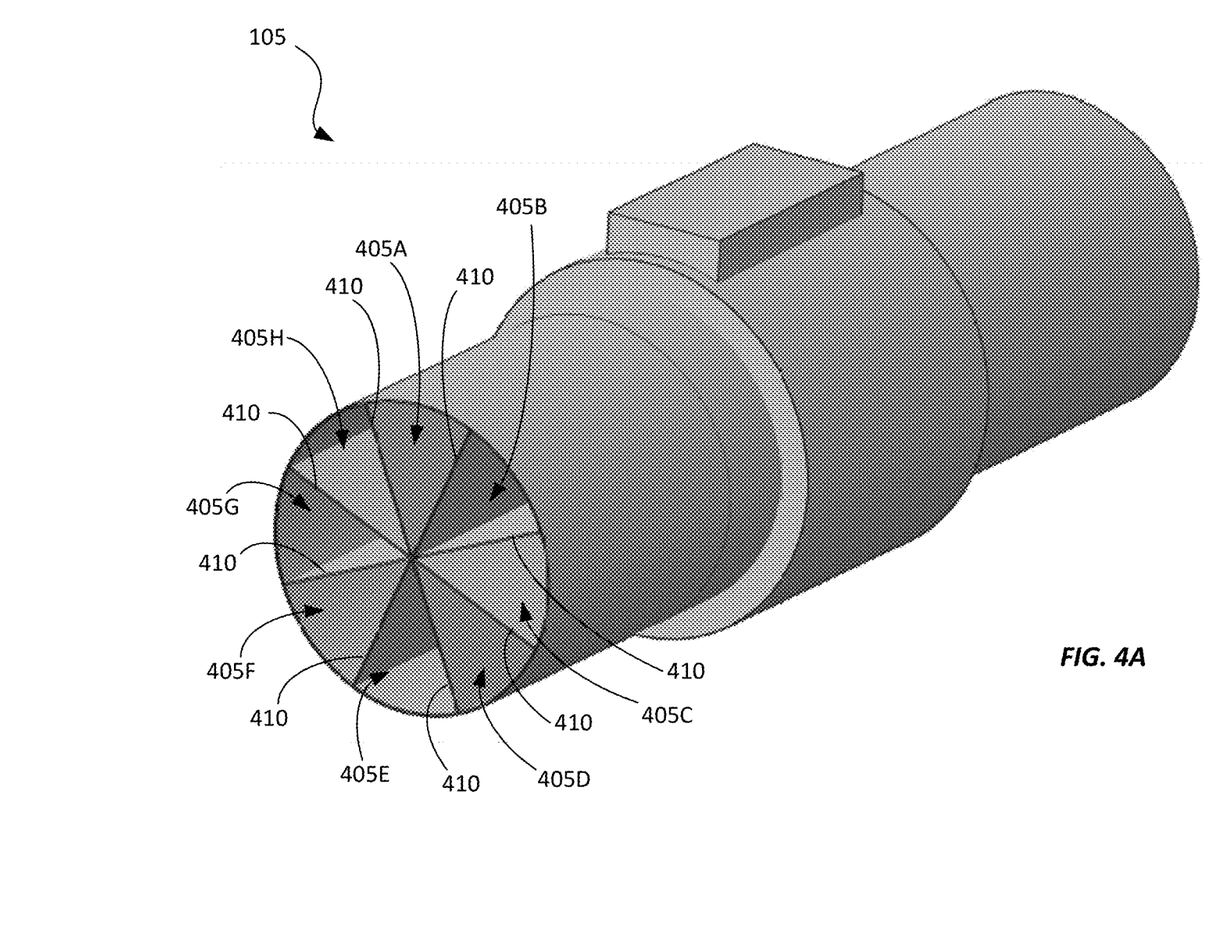
FIGS. 4A-4B schematically illustrate an example configuration of the meter subsystem according to some embodiments.
Figure 4B:
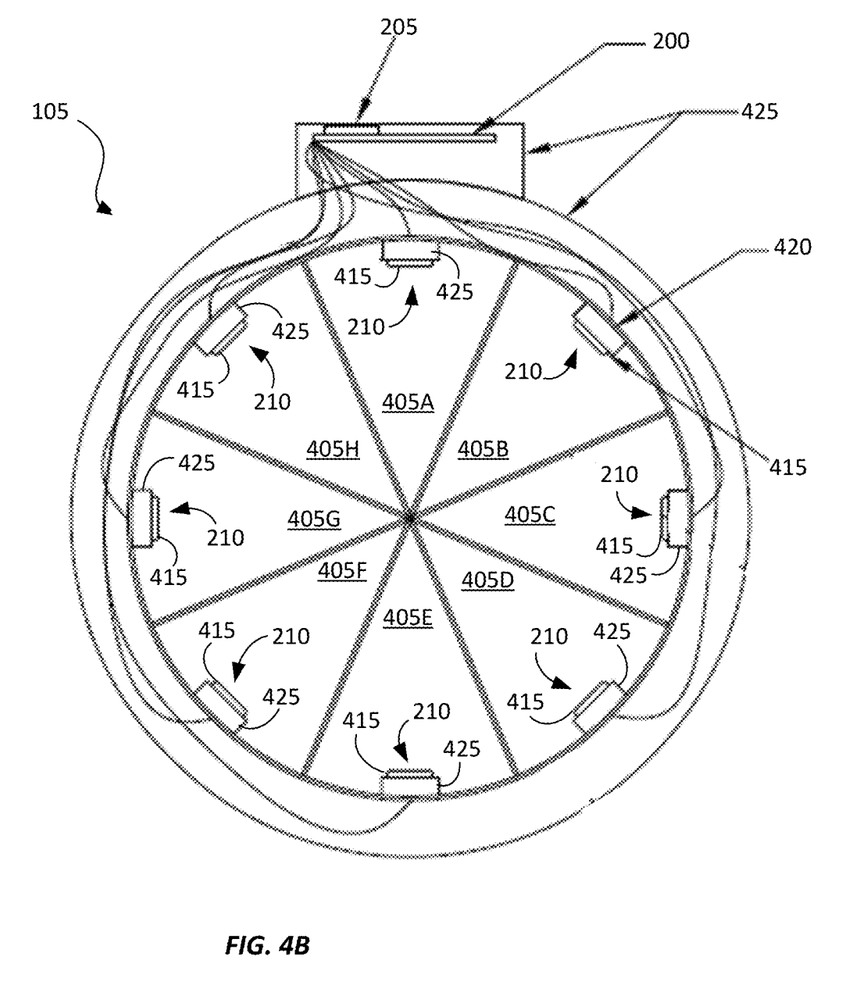

FIGS. 4A-4B schematically illustrate one example configuration of the meter subsystem 105 according to some embodiments. As seen in FIGS. 4A and 4B, the meter subsystem 105 may include eight measurement zones 405 (referred to herein collectively as "the measurement zones 405" and individually as "a first measurement zone 405A," "a second measurement zone 405B," and the like). Each of the measurement zones 405 may be separated by one or more straightening vanes 410. Accordingly, in some embodiments, each measurement zone 405 is formed or defined by the straightening vanes 410. FIG. 4B is a cross-sectional view of FIG. 4A. Each of the measurement zones 405 may be associated with a water sensor 210. In the illustrated example of FIG. 4B, the water sensors 210 are illustrated as paddle sensors including a paddle 415 and a paddlewheel sensor 420 associated with each paddle sensor. As seen in FIG. 4B, each water sensor 210 is wired (within a housing 425 separate from the water passageway) to the controller 200. As also seen in FIG. 4B, the human machine interface 205 may also be included within the housing 425.

Accordingly, in some embodiments, the meter subsystem 105 provides flow segmentation such that flow rate (water use data) across multiple measurement zones of the water passageway is integrated (for example, by the controller 200). In such embodiments, the controller 200 may include one or more input channels for receiving collected water use data from each of the water sensors 210. The controller 200 may accumulate water use data for each measurement zone, totaled water use data for each measurement zone, or a combination thereof. Such an integration of multiple measurements allows for the improvement of measurement accuracy and confidence, the verification of meter operations and measurements, and the like. Alternatively or in addition, configuring the meter subsystem 105 such that flow segmentation is achieved (via the two or more water sensors 210) enables the meter subsystem 105 (for example, via the controller 200) to determine (or detect) when the water passageway is not full of water, which is often a shortcoming of current meter measurement methods. For example, when full water passageway flow is not present, an uppermost water sensor 210 does not turn or is irregular in its speed. The controller 200 may use the output of that water senor 210 to measure water use or flow based on that segment (or measurement zone) of the water passageway not being full.

Returning to FIG. 2, the meter subsystem 105 also includes the failure sensor 220. The failure sensor 220 may include, for example, a vibration sensor, an accelerometer, a pressure sensor, or the like. The failure sensor 220 collects failure data related to an integrity of operating status of the meter subsystem 105 (or one or more components thereof). The failure data may be indicative of a failure (an eminent failure or an actual failure) of one or more components of the meter subsystem 105, such as one or more of the water sensors 210. The failure sensor 220 may transmit the collected failure data to the controller 200 for analysis. In some embodiments, the controller 200 analyzes the failure data to predict or determine an eminent or potential failure of, for example, one or more of the water sensors 210. As one example, when a bearing failure is eminent, vibration will increase. Accordingly, when the controller 200 identifies an increase in vibration (a vibration above a predetermined threshold), the controller 200 may determine an eminent failure for a water sensor 210 associated with the vibration. As another example, the failure sensor 220 may be a pressure sensor on top of the water passageway to measure pressure or water presence and velocity of a propeller or paddle. The controller 200 may transmit (through a Bluetooth or cellular connection) an alert or warning to an irrigation entity (via the user device 120, the human machine interface 205, or a combination thereof) based on the failure data. For example, the controller 200 may generate and provide an alert indicating an actual failure, an eminent failure, or a combination thereof. In some embodiments, the alert may include the failure data, other relevant data or information, or a combination thereof. Accordingly, in some embodiments, the meter subsystem 105 (for example, the controller 200) uses the failure data to predict a failure prior to a failure occurring, to detect a failure after a failure has occurred, or a combination thereof.

The energy storage device 235 and the photovoltaic power management subsystem 240 may be implemented as a low power supply system that powers one or more components of the meter subsystem 105. As seen in FIG. 2, the photovoltaic power management subsystem 240 includes a photovoltaic device 245. The photovoltaic device 245 may include, for example, a solar panel, a solar cell, another photovoltaic device, or the like. In some embodiments, the photovoltaic power management subsystem 240 includes additional or different components than illustrated in FIG. 2, such as a solar inverter, an additional photovoltaic device, or the like. As seen in FIG. 2, the photovoltaic power management subsystem 240 is coupled to the energy storage device 235. The energy storage device 235 is configured to store energy produced by (or received from) the photovoltaic power management subsystem 240. The energy storage device 235 may include, for example, a super capacitor or another suitable energy storage mechanism or device. As one example, the energy storage device 235 is a super capacitor that is recharged with energy produced by the photovoltaic power management subsystem 240.

As seen in FIG. 2, the meter subsystem 105 also includes the human machine interface 205. The human machine interface 205 may include one or more input devices, one or more output devices, or a combination thereof. Accordingly, in some embodiments, the human machine interface 205 allows a user to interact with (for example, provide input to and receive output from) the meter subsystem 105. For example, the human machine interface 205 may include a keyboard, a cursor-control device (for example, a mouse), a touch screen, a scroll ball, a mechanical button, a display device (for example, a liquid crystal display ("LCD")), a printer, a speaker, a microphone, or a combination thereof. As one example, the human machine interface 205 may include an LCD with a button that when pressed powers the LCD to display information, such as flow rate and totalized values such that power is conserved. The human machine interface 205 may be mounted to or included within a housing of the meter subsystem 105 (such as a waterproof or all-weather enclosure) or may communicate with the meter subsystem 105 over one or more wired or wireless connections.

The meter subsystem 105 is configured to communicate (or transmit) data using the transmitter 230, the cellular modem 225, or a combination thereof. In many instances, irrigation entities implement meter systems (for example, the meter subsystem 105) in regions or areas where cellular signals are not reliable, not readily available, or the like. Accordingly, as seen in FIG. 2, the meter subsystem 105 may include the transmitter 230. The transmitter 230 may be, for example, a Bluetooth beacon, such as a Low Energy Bluetooth Beacon. In some embodiments, the controller 200 transmits data to the transmitter 230, such as meter data, totalized meter data, a meter identifier (for example, the meter identifier 320), timestamped meter data, and the like. When the user device 120 comes into a connection distance of the meter subsystem 105 (for example, the transmitter 230), the user device 120 receives the data from the transmitter 230. Accordingly, in some embodiments, the transmitter 230 is used to detect a user device 120 before a connection is established. Without making a cellular connection, the user device 120 (with an application processing/running in the background) acquires data from the meter subsystem 105. Once the user device 120 establishes a cellular connection, the user device 120 may then transmit the acquired data to the server 110. Accordingly, in some embodiments, the transmitter 230 enables data to be collected (or acquired) without one or more cellular modem modules (for example, the cellular modem 225).

Alternatively or in addition, in some embodiments, the meter subsystem 105 includes the cellular modem 225 (as seen in FIG. 2). The meter subsystem 105 may utilize the cellular modem 25 to perform, for example, daily data transmissions (such as when the meter subsystem 105 has adequate power from the energy storage device 235). Accordingly, in some embodiments, the meter subsystem 105 may include the transmitter 230, the cellular modem 225, or a combination thereof.

Returning to FIG. 1, the user device 120 is a computing device. In some embodiments, the user device 120 is a mobile or portable computing device, such as a laptop computer, a tablet computer, a smart watch or other wearable, a smart phone or other cellular phone or device, or the like. The user device 120 may be used by an irrigation entity to interact with the server 110, the meter subsystem 105, or a combination thereof. Alternatively or in addition, in some embodiments, the functionality (or a portion thereof) described herein as being performed by the server 110 may be locally performed by the user device 120. Although not illustrated in FIG. 1, the user device 120 may include similar components as the controller 200, such as an electronic processor (for example, a microprocessor, an ASIC, or another suitable electronic device), a memory (for example, a non-transitory, computer-readable storage medium), a communication interface, such as a transceiver, for communicating over the communication network 130 and, optionally, one or more additional communication networks or connections, and one or more human machine interfaces.

In the example illustrated in FIG. 1, the user device 120 includes a user application 380. In some embodiments, the user application 380 is stored locally on the user device 120 (for example, on a memory of the user device 120). However, in other embodiments, the user application 380 is stored remotely from the user device 120 and is accessible via the user device 120 (for example, via a web browser application).

In some embodiments, the user application 380 is a software application executable by an electronic processor of the user device 120. The electronic processor of the user device 120 executes the user application 380 to interface or interact with the server 110, the meter subsystem 105, or a combination thereof. As one example, the user application 380 may provide a user interface (for example, a graphical user interface) for receiving user input from an irrigation entity. The user application 380 may transmit the user input to the server 110, the meter subsystem 105, or a combination thereof. The user input may include, for example, field data (such as a soil type, an irrigated area, a soil texture, a crop type, a crop season duration, a location, a water district, and the like). As another example, the user application 380 may receive the meter data from the meter subsystem 105 (for example, through a low energy Bluetooth connection as described above with respect to the transmitter 230) and transmit the meter data to the server 110 (for example, through a cellular connection). As yet another example, the user application 380 may provide a user interface (for example, a graphical user interface) for providing (or displaying) information to an irrigation entity, such as a displayable report including water use data, field data, failure data, peer performance data, and the like. As yet another example, the user application 380 may provide a user interface (for example, a graphical user interface) for facilitating and managing digital water assets, such as a banking of a water right (for example, conserving water in one crop year for use in a subsequent crop year), an exchange or trade of water rights (for example, a cryptocurrency or water credit associated with an irrigation entity's water rights or water allocation), or a combination thereof. As one example, a water jurisdiction that allows water banking may allow an irrigation entity to conserve water in one crop year and use it in a subsequent crop year.

As noted above, the system 100 also includes the server 110. The server 110 includes a computing device, such as a server, a database, or the like. Although not illustrated in FIG. 1, the server 110 may include similar components as the controller 200, such as an electronic processor (for example, a microprocessor, an ASIC, or another suitable electronic device), a memory (for example, a non-transitory, computer-readable storage medium), a communication interface, such as a transceiver, for communicating over the communication network 130 and, optionally, one or more additional communication networks or connections, and one or more human machine interfaces. In some embodiments, the server 110 is a cloud server running in a cloud computing environment. Alternatively or in addition, the server 110 is an internet of things ("IoT") cloud server configured to store and process IoT data, such as the meter data associated with the meter subsystem 105. The server 110 may also perform additional functionality other than the functionality described herein. Additionally, the functionality (or a portion thereof) described herein as being performed by the server 110 may be distributed among multiple servers or devices (for example, as part of a cloud service or cloud-computing environment). Alternatively or in addition, as noted above, in some embodiments, the functionality (or a portion thereof) described as being performed by the server 110 may be performed by other servers or devices, such as the user device 120, the controller 200, or the like.

An electronic processor of the server 110 is configured to access and execute software stored in a memory of the server 110. The software may include firmware, one or more applications, program data, filters, rules, one or more program modules, and other executable instructions. For example, the software may include instructions and associated data for performing a set of functions, including the methods described herein.

For example, as illustrated in FIG. 1, the memory of the server 110 includes a meter analytics application 385. The electronic processor of the server 110 may access and execute the meter analytics application 385 for performing meter analytics and reporting. As one example, the electronic processor of the server 110 may execute the meter analytics application 385 to access data (such as, for example, the meter data, peer performance data, and the like) and generate feedback based on the data, which may be displayed (through one or more displayable reports) via, for example, the user application 380, the human machine interface 205, or a combination thereof.

Alternatively or in addition, the memory of the server 110 includes a digital asset application 388. The electronic processor of the server 110 may access and execute the digital asset application 388 for providing a digital asset exchange system or service. As one example, the electronic processor of the server 110 may execute the digital asset application 388 to generate and access an electronic ledger 390, which may be used for implementing a digital asset exchange system or service. As seen in FIG. 1, in some embodiments, the server 110 also stores the electronic ledger 390. The electronic ledger 390 may be, for example, a type of database for storing information or data records, such as records of transactions of digital water assets.

Figure 5:
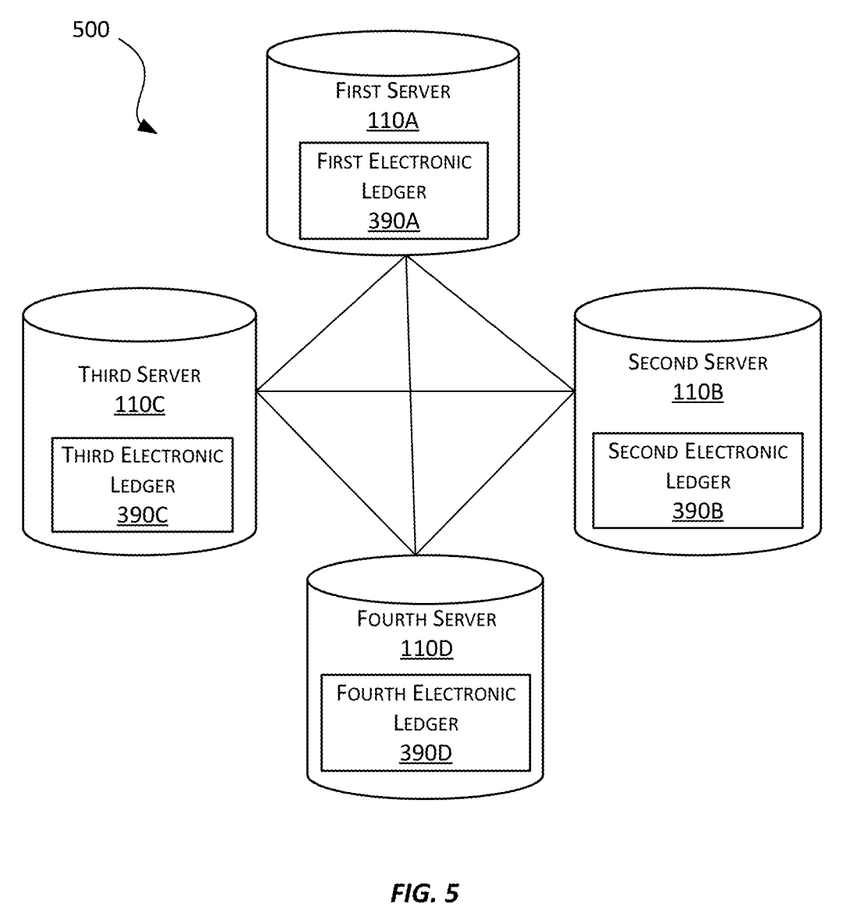
FIG. 5 schematically illustrates an example peer-to-peer network according to some embodiments.

In some embodiments, the electronic ledger 390 is part of a distributed ledger (or other database). A distributed ledger (or a shared ledger) is a type of database of digital data (transaction records) that is replicated, shared, and synchronized across each member (referred to as a node) of a network such that each member has its own private ledger. In general, a distributed ledger uses independent computing devices or servers for each node (or member) to record, share, and synchronize transactions in their respective electronic ledgers instead of keeping data centralized as in a traditional ledger. A blockchain is one type of distributed ledger but embodiments described herein are not limited to any particular type of distributed ledger. As one example, FIG. 5 illustrates an example peer-to-peer network 500 according to some embodiments. As seen in FIG. 5, the peer-to-peer network 500 includes a plurality of nodes (depicted as a first server 110A, a second server 110B, a third server 110C, and a fourth server 110D). Each of the servers 110A-110D include their own private ledger (depicted as a first electronic ledger 390A, a second electronic ledger 390B, a third electronic ledger 390C, and a fourth electronic ledger 390D). Alternatively or in addition, in some embodiments, the electronic ledger 390 is a centralized ledger maintained by the server 110. In some embodiments, a central ledger exists on a server (for example, the first server 110A, the second server 110B, or the like) that is part of the peer-to-peer network 500 of FIG. 5 where the electronic ledgers 390 are replicated and agree. In some embodiments, the electronic ledgers 390 use a timestamp server or meter totalizer values to create a hash. In some embodiments, proof of stake, or proof of work, may be used. Blocks may be created from these hashes and may be verified using a proof of work procedure before new data can be added to the electronic ledger 390. As blocks are added, the proof of work becomes more difficult as the nodes must process all of the previous blocks to add new blocks. Proof of work difficulty increases with increased blocks, nodes, and difficulty in verifying blocks. A server may accept blocks by creating the next block, those that don't agree are ignored, and only honest servers with duplicate electronic ledgers may be accepted. In some embodiments, servers may be mining computers or flowmeter hardware may also provide the mining function for the blockchain and provide proof of work or consensus. In some embodiments conventional mining, staking pools, or the meters may perform the mining, or tokenizing may be used. In some embodiments (e.g., with proof of stake being used), it may be feasible to use the meters as miners.

The electronic ledger 390 may be associated with one or more irrigation entities, one or more meter subsystems 105, or combination thereof. As one example, an irrigation entity may have a first meter subsystem, a second meter subsystem, and a third meter subsystem. In some embodiments, the electronic ledger 390 may include digital data associated with the first meter subsystem, the second meter subsystem, and the third meter subsystem. However, in other embodiments, the electronic ledger 390 may be associated with the first meter subsystem and the second meter subsystem while another electronic ledger is associated with the third meter subsystem. As another example, the electronic ledger 390 may be associated with one or more meter subsystems 105 of a first irrigation entity and one or more meter subsystems 105 of a second irrigation entity. Alternatively or in addition, in some embodiments, the electronic ledger 390 is associated with a specific characteristic, such as a water district, a crop type, a soil type, an irrigation entity type, another characteristic, or a combination thereof. As one example the electronic ledger 390 may be associated with a particular crop type for a particular water district. According to this example, the electronic ledger 390 may include digital data associated with one or more meter subsystems 105, one or more irrigation entities, or a combination thereof for that water district and crop type.

Figure 6:
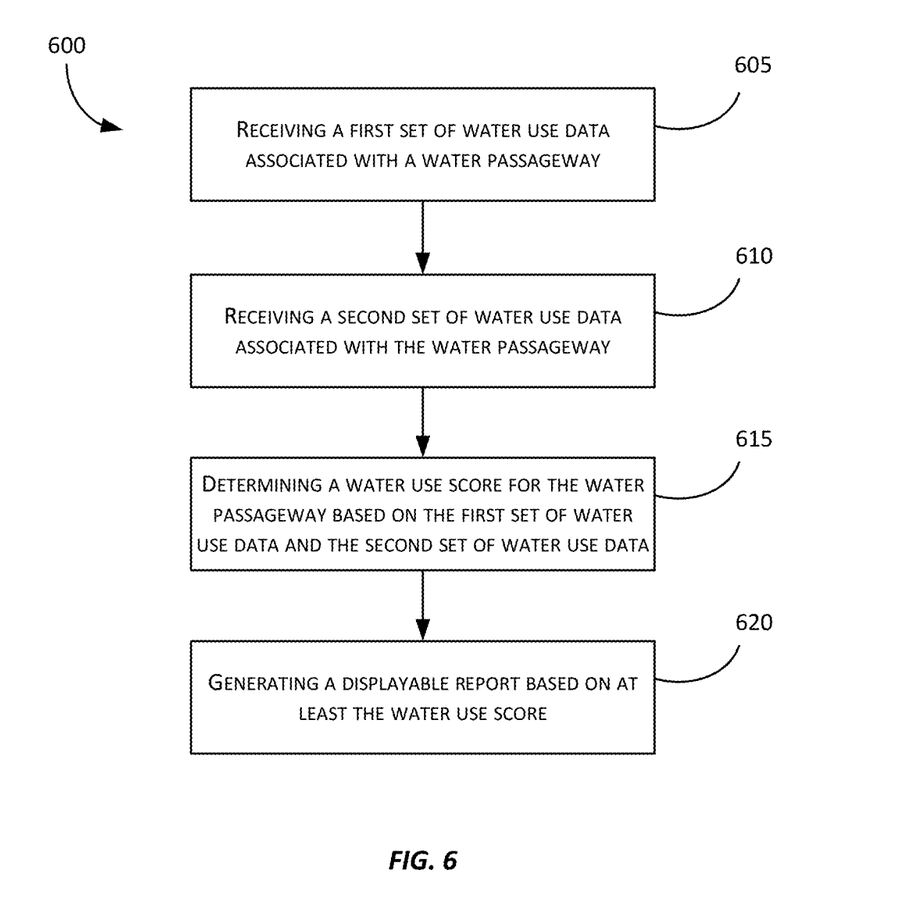
FIG. 6 is a flowchart illustrating a method of providing water use feedback using the system of FIG. 1 according to some embodiments.

FIG. 6 is a flowchart illustrating a method 600 of providing water use feedback using the system 100 according to some embodiments. The method 600 is described as being performed by the server 110 and, in particular, the meter analytics application 385 as executed by an electronic processor of the server 110. However, the functionality (or a portion thereof) described with respect to the method 600 may be performed by other devices, such as the controller 200 (via the electronic processor 300 executing instructions) or the user device 120 (via an electronic processor executing instructions), or distributed among a plurality of servers or devices, such as a plurality of servers included in a cloud service or cloud computing environment.

As seen in FIG. 6, the method 600 includes receiving a first set of water use data associated with a water passageway (at block 605) and receiving a second set of water use data associated with the water passageway (at block 610). As noted above, water use data is collected or measured by one or more of the water sensors 210 of the meter subsystem 105. The first set of water use data may be collected by a first water sensor 210 and the second set of water use data may be collected by a second water sensor 210. In some embodiments, the first water sensor 210 and the second water sensor 210 collect redundant water use data. As one example, the first water sensor 210 and the second water sensor 210 are positioned such that the first water sensor 210 and the second water sensor 210 collect water use data across the same (or similar) position or location of a water passageway. Accordingly, in some embodiments, the first set of water use data and the second set of water use data is a collection of redundant water use data associated with the same water passageway (or portion thereof). The water use data collected by the first and second water sensors 210 is transmitted to and stored by the controller 200 (for example, as a collection of water use data). In some embodiments, the controller 200 encrypts the water use data (for example, with SHA-256 encryption). The controller 200 then transmits (via the transmitter 230, the cellular modem 225, or a combination thereof) the water use data to a remote device, such as the server 110, the user device 120, another remote device, or a combination thereof.

Accordingly, in some embodiments, the server 110 receives the collection of water use data (for example, the first set of water use data and the second set of water use data) directly from the meter subsystem 105 (or a component thereof) via the communication network 130. As one example, the controller 200 may directly transmit the collection of water use data using the cellular modem 225 to the server 110. Alternatively or in addition, in some embodiments, the server 110 receives the collection of water use data from the meter subsystem 105 through an intermediary device, such as the user device 120. In such embodiments, the meter subsystem 105 may transmit (via the transmitter 230) the water use data to the user device 120 (for example, the user application 380) over, for example, a low energy Bluetooth connection. When the user device 120 later establishes a cellular connection, the user device 120 (via the user application 380) may then transmit the collection of water use data to the server 110. Accordingly, in some embodiments, the meter subsystem 105 (for example, the controller 200) transmits the collection of water use data in response to detecting a presence of the user device 120.

As seen in FIG. 6, the server 110 also determines a water use score for the water passageway based on the first set of data and the second set of data (at block 615). A water use score may represent or indicate how much water has flowed through the water passageway (for example, how much water has been used) in comparison to a water allocation. In some embodiments, the water allocation is a metric of water available for use by an irrigation entity. The water allocation may be allocated by a regulatory body, agency, or entity. A regulatory body, agency, or entity may allocate the water allocation to the irrigation entity based on one or more conditions (for example, a site, a crop type, or the like). The water use score may help track a water usage in light of a water allocation for an irrigation entity associated with the meter subsystem 105. Accordingly, in some embodiments, the server 110 accesses a water allocation associated with the irrigation entity (as a whole), the meter subsystem 105, or a combination thereof. The server 110 may then determine the water use score by comparing the collection of water use data (the first set of water use data and the second set of water use data) to the water allocation. Accordingly, in some embodiments, the water use score may indicate a water credit or a water liability. The water use score may indicate a water credit when an irrigation entity's water use is below a water allocation for that irrigation entity (for example, when an irrigation entity does not use all of its water allocation). The water use score may indicate a water liability when an irrigation entity's water us is above a water allocation for that irrigation entity (for example, when an irrigation entity uses all or more of its water allocation). In some embodiments, the water allocation may be provided by an irrigation entity (via the user application 380, the human machine interface 205, or the like). In such embodiments, the water allocation may be stored in a memory of the server 110. Alternatively or in addition, the water allocation may be stored in a remote database accessible by the server 110. As one example, a regulatory body, agency, or entity may communicate the irrigation entity's water allocation to the irrigation entity. The irrigation entity may then manually enter or provide the water allocation via the user application 380, the human machine interface 205, or a combination thereof. As another example, a regulatory body, agency, or entity may maintain a database that hosts or stores water allocations for various irrigation entities. The server 110 may request the water allocation associated with a particular irrigation entity (for example, in response to a manual request initiated by the irrigation entity, in response to a notification of a water allocation being allocated to the irrigation entity, or a combination thereof). In some embodiments, the server 110 implements one or more machine learning models, artificial intelligence models, or the like to determine the water use score.

Alternatively or in addition, the server 110 may determine the water use score based on user input. As noted above, an irrigation entity may provide user input via the user application 380 of the user device 120, the human machine interface 205 of the meter subsystem 105, or a combination thereof. The user input may include the field data, such as a location, a crop type, a soil type, a soil texture, a water district, an irrigation entity type, a crop season duration, a water allocation, and the like. Accordingly, in some embodiments, the server 110 receives the user input from the user application 380 of the user device 120, the human machine interface 205 of the meter subsystem 105, or a combination thereof.

Alternatively or in addition, the server 110 may determine the water use score based on peer performance data. Peer performance data may include water use data, field data, and the like associated with one or more additional irrigation entities (peer irrigation entities). In some embodiments, the peer performance data is associated with a single additional irrigation entity. However, in other embodiments, the peer performance data is aggregated data associated with more than one additional irrigation entity. The server 110 may receive (or access) the peer performance data from a remote device, a remote database, another meter subsystem (for example, a meter subsystem associated with an additional irrigation entity), or the like. As one example, the server 110 may receive the peer performance data directly from a meter subsystem associated with an additional irrigation entity. As another example, the server 110 may receive the peer performance data from a remote database that stores the peer performance data.

The server 110 may determine the water use score by comparing water use data associated with the meter subsystem 105 with water use data associated with an additional irrigation entity (a peer irrigation entity). Accordingly, in some embodiments, the peer performance data has at least one characteristic in common with the meter subsystem 105 (or water passageway), such as a crop type, a soil type, a soil texture, a water district, an irrigation entity type, a crop season duration, or the like. As one example, where the meter subsystem 105 is within "Water District 1," the server 110 may access water use data associated with an additional irrigation entity within Water District 1 (as peer performance data) and determine the water use score by comparing the water use data associated with the meter subsystem 105 to the water use data associated with the additional irrigation entity within Water District 1. As another example, where the meter subsystem 105 is within Water District 1 and associated with a corn crop, the server 110 may access water use data associated with each additional irrigation entity within Water District 1 that is irrigating corn (as peer performance data) and determine the water use score by comparing the water use data associated with the meter subsystem 105 to the water use data associated with each additional irrigation entity within Water District 1 that is irrigating corn.

Accordingly, in some embodiments, the server 110 determines the water use score based on user input, peer performance data, water use data (for example, the first set of water use data and the second set of water use data), a water allocation, or a combination thereof.

The server 110 also generates a displayable report based on at least the water use score (at block 620). The displayable report may include, for example, information associated with the meter subsystem 105, the irrigation entity, an additional irrigation entity, and the like. For example, the displayable report may include the water use score, water use efficiency, water use data, field data, failure data, peer performance data, annual crop water demand, application depth data, and the like. Accordingly, the displayable report provides information in a meaningful way such that an irrigation entity may easily understand, interpret, and improve or optimize its water use. In some embodiments, the displayable report is generated and provided in real-time (or near real-time) such that an irrigation entity is provided with the most current data. In some embodiments, the server 110 may generate the displayable report automatically at the end of a crop year. Alternatively or in addition, the server 110 may generate the displayable report in response to a request from an irrigation entity. As one example, an irrigation entity may request the displayable report during a crop year (such that the irrigation entity may evaluate its water use so far for that crop year and alter its water use if desired). As another example, an irrigation entity may request the displayable report at the end of the crop year (for example, as an end of the crop year report).

In some embodiments, the server 110 transmits the displayable report to the user device 120 (the user application 380). In response to receiving the displayable report, the user device 120 (via the user application 380) may provide (or display) the displayable report to an irrigation entity such that the irrigation entity may interact with and view the displayable report. Alternatively or in addition, in some embodiments, the server 110 transmits the displayable report to the meter subsystem 105. In such embodiments, the meter subsystem 105 may provide (or display) the displayable report to an irrigation entity using the human machine interface 205. Accordingly, an irrigation entity may interact with and view the displayable report via the user application 380, the human machine interface 205, or a combination thereof. However, in some embodiments, the server 110 transmits the displayable report to another remote device or system for display to an irrigation entity, another entity (such as an additional irrigation entity, a water agency, a regulatory body, and the like), or a combination thereof.

As one example, a pivot irrigator (an irrigation entity) applying water to corn is provided their water use and how other neighboring pivots in the region are consuming water such that the irrigator has a metric of his/her performance (provided via the displayable report), which may be done at the end of the season, during the season, or a combination thereof. Additionally, the displayable report may indicate how an irrigation entity is using water at a particular field and relative to the irrigation entity's other fields. Thus, an irrigation entity may have information in-season and post season about their irrigation water use, by field, by farm, by region, and the like. Additionally, by aggregating data from similar soil types, similar irrigation systems, and similar climate patterns, the server 110 may generate one or more displayable reports showing an irrigation entity its irrigation timing, water use efficiency performance and water use. Such information may be used to improve management or upgrade irrigation systems to be more efficient. In some embodiments, this data may be provided to water resource agencies (stripped of identifying information) to aid the water resource agencies in their water management. For example, in a regulatory environment, a water resource agency may have real-time information about water rights compliance and the ability to make in-season changes.

Figure 7:
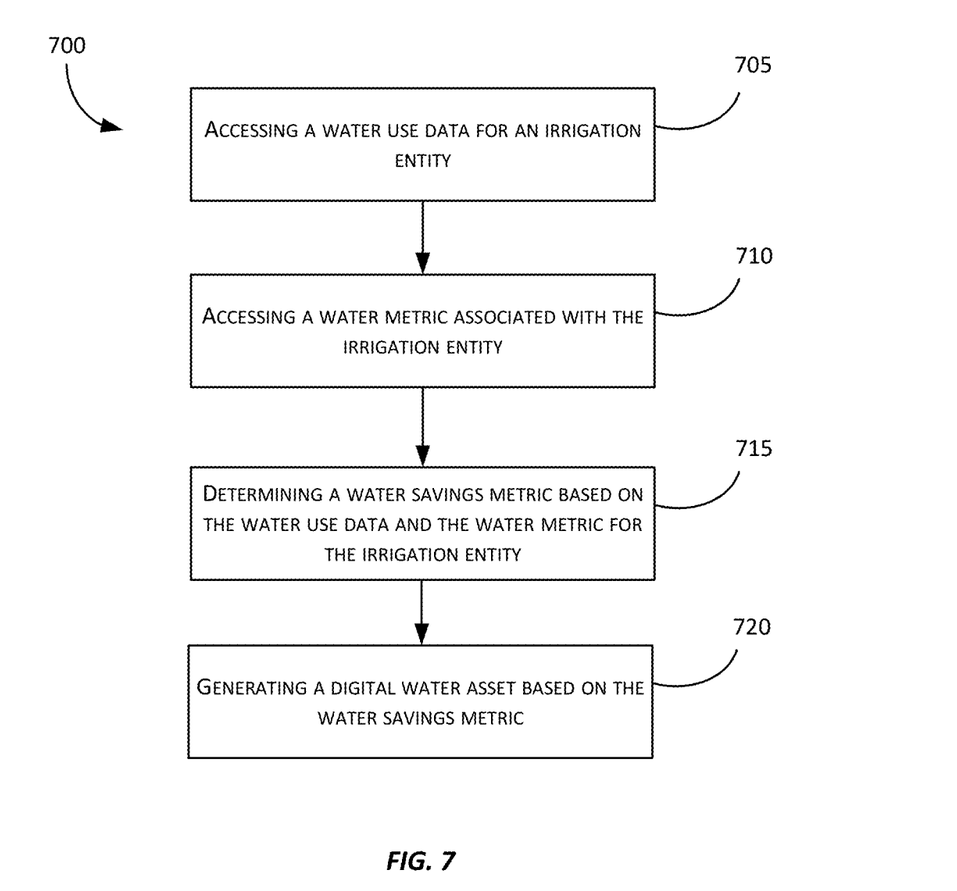
FIG. 7 is a flowchart illustrating a method of providing digital assets using the system of FIG. 1 according to some embodiments.

FIG. 7 is a flowchart illustrating a method 700 of providing digital assets using the system 100 according to some embodiments. The method 700 is described as being performed by the server 110 and, in particular, the digital asset application 388 as executed by an electronic processor of the server 110. However, the functionality described with respect to the method 700 may be performed by other devices, such as the controller 200 (via the electronic processor 300 executing instructions) or the user device 120 (via an electronic processor executing instructions), or distributed among a plurality of devices, such as a plurality of servers included in a cloud service or cloud computing environment.

As seen in FIG. 7, the method 700 includes accessing (or receiving) a water use data for an irrigation entity (at block 705). In some embodiments, the server 110 receives or accesses the water use data in a similar manner as described with respect to method 600 of FIG. 6. In some embodiments, the water use data is stored in a memory of the server 110. Alternatively or in addition, the water use data is stored at a remote device or database. In such embodiments, the server 110 accesses the water use data from the remote device or database.

The server 110 also accesses (or receives) a water metric (or allocation) associated with the irrigation entity (at block 710). A water metric is an amount of water that is assigned to a meter (for example, the meter subsystem 105) or an irrigation entity. In some embodiments, a regulatory body assigns the water metric for a set duration, such as a year. In a regulatory environment where water rights are assigned or allocations are imposed, the water metric may be populated with this allocation or water right. In a non-regulatory environment, the water metric is a voluntary metric assigned by a water management authority. In some embodiments, the water metric is stored in a memory of the server 110. Alternatively or in addition, the water metric is stored at a remote device or database. In such embodiments, the server 110 accesses the water metric from the remote device or database.

As seen in FIG. 7, the server 110 also determines a water savings metric based on the water use data and the water metric for the irrigation entity (at block 715). A water savings metric represents an unused portion of the water metric. The server 110 also generates a digital water asset based on the water savings metric (at block 720). A digital water asset may represent or function as a financial mechanism for trading and exchanging water resources. As one example, a single digital water asset may represent the value of one hectare-centimeter or 1000 cubic meters of water.

Accordingly, when actual seasonal water use is less than the water metric, a digital water asset or currency may be created, traded, and sold by the irrigation entity. Accordingly, in some embodiments, the server 110 generates the digital water asset as a transferable water right representing an unused portion of the water metric or allocation. The server 110 may assign ownership of the digital water asset to the irrigation entity. In some embodiments, the server 110 also enables (facilitates or manages) the transfer or exchange of digital water assets, such as between the irrigation entity and another irrigation entity. As one example, the server 110 may receive a transfer request from the irrigation entity requesting the transfer of ownership of the digital water asset to the other irrigation entity. In response to verifying the transfer request, the server 110 may transfer ownership of the digital water asset to the other irrigation entity. Additionally, the server 100 may generate a transaction record associated with the ownership transfer of the digital water asset. The transaction record may be stored in (or added to) the electronic ledger 390. As noted above, in some embodiments, the electronic ledger 390 is a distributed ledger where each transaction record is replicated, shared, and synchronized across each member (or node) of a network such that each member has its own private ledger. In such embodiments, the server 100 may transmit the transaction record to each node (or member) of a network (such as a network of irrigation entities) such that each node's private ledger reflects the transaction record, as described above with respect to FIG. 5.

As one example, the digital water asset may be part of a cryptocurrency exchange system for trading water resources as water coins (or digital water assets). In some embodiments, the amount of coins available is controlled by the fact that the coins are created through water savings or rights transfers. In some embodiments, the water coin is based on water rights or allocations. Water coins may be specific to a water resource region. Accordingly, in some embodiments, water coins are configured on a regional basis because water rights, allocations, and metrics vary widely. Water coins may be created when a water right is registered with a water ledger. An initial price of a water coin may be determined, for example, by a water entity (such as a water agency or regulatory body). Alternatively, an initial price of a water coin may be determined using the average price of coins in the same water source or delivery region. In some embodiments, coin prices are a function of market supply and demand.

Accordingly, irrigation entities may trade water between themselves, others in the general public, or a combination thereof. As one example, an investor may purchase water coins in a region as an investment because the water coins should appreciate in value as water resources become limited. Additionally, government agencies may purchase coins to incentivize conservation. For example, irrigation entities may "bank" water in years where water can be conserved and "buy" back water in deficit years. Accordingly, the embodiments described herein enable water regulators to manage aquifer withdraws long term, reward irrigation entities that achieve true conservation, and the like.

Conceptually, the water coin is a self-adjusting process. Demand for water resources are expected to continue to create strain on water resources and food production capacity. Thus, as water coins are generated (creating value in water savings and conservation), water use efficiency increases will create additional water coins and the value of the water coins will increase in proportion to the available water that can be conserved or diverted for best use. For example, as water coins become scarce, their value will increase and, thus, increase the demand for water conservation. Accordingly, society may participate in the intrinsic value of its water resources. Additionally, the embodiments described herein bypass complications with water rights, water right ownership, land ownership, water ownership or transfers and provide a capitalist mechanism as a solution to complicated sustainability problems. Thus, water agencies instead of incentivizing practices, may incentivize management and real outcomes with respect to conserving water resources instead of incentivizing practices. As one example, instead of compensating an irrigation entity to implement a more efficient irrigation system (where the conserved water is likely to be diverted elsewhere), water coins may be purchased, which results in real aquifer reductions. In some embodiments, the water coin system (the digital water assets) may be governed by a local regulatory body such that the local regulatory body may determine how the water coin is valued and implemented in their respective water resource region.

Various features and advantages of certain embodiments are set forth in the following claims.

What is claimed is:

1. A redundant meter measurement system, the system comprising:
   a conduit defining a water passageway configured to guide water along a direction of travel;
   a first water sensor positioned within the water passageway and configured to measure a first set of water use data in a first measurement zone within the water passageway;
   a second water sensor positioned within the water passageway and configured to measure a second set of water use data in a second measurement zone within the water passageway, wherein the first measurement zone and the second measurement zone each extend along a common plane that is configured to be perpendicular to the direction of travel, wherein the first water sensor is spaced separately apart from the second water sensor; and
   a controller communicatively coupled to the first water sensor and the second water sensor, the controller configured to
   receive the first set of water use data from the first water sensor,
   receive the second set of water use data from the second water sensor,
   store the first set of water use data and the second set of water use data as a collection of water use data, and
   enable transmission of the collection of water use data to a remote device.

2. The system of claim 1, wherein at least a portion of the second set of water use data is redundant to at least a portion of the first set of water use data.

3. The system of claim 1, wherein the controller is further configured to receive failure data from a failure sensor, and detect an impending failure based on at least the failure data.

4. The system of claim 1, wherein the controller is further configured to determine failure data from the water sensors, and predict or detect a failure based on the sensor data over time.

5. The system of claim 1, wherein the controller is configured to transmit the collection of water use data in response to detecting a presence of the remote device.

6. The system of claim 1, wherein the controller is configured to transmit the collection of water use data using a low energy Bluetooth connection.

7. The system of claim 1, wherein at least a portion of the first measurement zone overlaps with at least a portion of the second measurement zone.

8. A redundant sensor flow meter system configured to measure water flow from more than one location, the flow meter system comprising:

a plurality of sensors positioned within a flow stream in a conduit;

an electronic processor coupled to the plurality of sensors;

a display coupled to the electronic processor, wherein the electronic processor and the display are configured to collect and display a sensor output from the plurality of sensors;

an on board firmware configured to use a multi sensor algorithm to estimate water flow through the conduit, wherein the algorithm is configured to adjust a flow estimate based on sensor bias and predict at least one of eminent failure, unacceptable error between sensors, or sensor failure; and a straightening vane within the flow stream configured to reduce turbulence, wherein the electronic processor is configured to sum a sensed flow within a cross-sectional area of the vane with one of the plurality of sensors;

wherein the system is configured to inform a user of a condition;

wherein the system is configured to collect information from the user about crop type, area irrigated, soil type, irrigation system type, and rainfall, for the purpose of determining a crop water use efficiency for an irrigation entity and meter application.

9. The system of claim 8, wherein the plurality of sensors includes multiple sensor types configured to predict a same average flow.

10. The system of claim 8, further comprising:

at least one of a bluetooth radio, radio spectrum radio, or cellular spectrum radio configured to transmit data from the system to a smartphone and central server, a power system comprising a supercapacitor and solar charging power management system;

wherein the central server is configured to collect data from meters and water allocations, water rights, and water metrics as published from governing bodies, wherein the central server is configured to determine water metrics from meter data and user input and is configured to calculate and determine at least one of available water allocations, credits, or liabilities for a water source.

11. A flow meter system comprising:

a sensor positioned within a water passageway and configured to measure an estimated water flow through the water passageway; and a server configured to receive information regarding the estimated water flow;

wherein the server is configured, based on the information, to generate a digital water asset or currency, wherein the digital water asset or currency is a transferable water right representing an unused portion of a water allocation for an irrigation entity;

wherein the sensor includes a first water sensor positioned within the water passageway and configured to measure a first set of water use data in a first measurement zone within the water passageway, and a second water sensor positioned within the water passageway and configured to measure a second set of water use data in a second measurement zone within the water passageway, wherein the first measurement zone and the second measurement zone each extend along a common plane that is configured to be perpendicular to a direction of travel of water within the water passageway, wherein the first water sensor is spaced separately apart from the second water sensor.

12. The flow meter system of claim 11, wherein the digital water asset or currency is configured to be traded and/or sold by the irrigation entity.

13. The flow meter system of claim 11, wherein the water allocation is a metric of water available for use by the irrigation entity.

14. The system of claim 13, wherein the water allocation is a published metric from a governing body.

15. The flow meter system of claim 11, wherein the server is configured to determine a water use score for the water passageway indicating an amount of water that has flowed through the water passageway, in comparison to the water allocation, and wherein the water use score is configured to indicate a water credit when the irrigation entity's water use is below the water allocation for the irrigation entity, wherein the water credit is configured to be translated into the digital water asset or currency.

16. The system of claim 11, wherein the server is a cloud server, and wherein the system has cloud connectivity with the cloud server via at least one of a low energy Bluetooth connection or a cellular connection.

17. The system of claim 11, further comprising an on-board firmware configured to use a multi sensor algorithm to estimate the water flow through the water passageway.

18. The system of claim 11, wherein the server is configured to transfer ownership of the digital water asset or currency to another irrigation entity, and wherein the server is configured to generate a transaction record associated with the transfer, wherein the transaction record is configured to be stored in an electronic ledger.

* * * * *